United States Patent [19]

Kelly

[11] 4,382,379

[45] May 10, 1983

[54] LEAK DETECTION APPARATUS AND METHOD FOR USE WITH TUBE AND TUBE SHEET JOINTS

[75] Inventor: John W. Kelly, Burbank, Calif.

[73] Assignee: Haskel Engineering and Supply Co., Burbank, Calif.

[21] Appl. No.: 218,670

[22] Filed: Dec. 22, 1980

[51] Int. Cl.³ .............................................. G01M 3/04
[52] U.S. Cl. ......................................... 73/46; 73/49.8
[58] Field of Search ............... 73/46, 49.6, 49.8, 49.5, 73/49.1; 138/89, 90, 91

[56] References Cited

U.S. PATENT DOCUMENTS

| | | | |
|---|---|---|---|
| 2,342,616 | 2/1944 | O'Brien | 73/46 |
| 2,507,124 | 5/1950 | Stillinger | 73/49.6 |
| 3,029,630 | 4/1962 | Cummins | 73/46 |
| 3,882,715 | 5/1975 | Slinger | 73/46 |
| 3,950,983 | 4/1976 | Slinger | 73/46 |

Primary Examiner—E. R. Kazenske
Assistant Examiner—Joseph W. Roskos
Attorney, Agent, or Firm—Fulwider, Patton, Rieber, Lee & Utecht

[57] ABSTRACT

A head that engages a face of a tube sheet has a mandrel extending from it for insertion in a tube. Pressurized test fluid is introduced through a conduit in the mandrel into an annular fluid-flow space between the mandrel and the tube. The fluid, which is confined by seals, flows around one end of the tube to the joint and, if the joint is not tight, emerges at the opposite face of the tube sheet where it can be detected.

11 Claims, 3 Drawing Figures

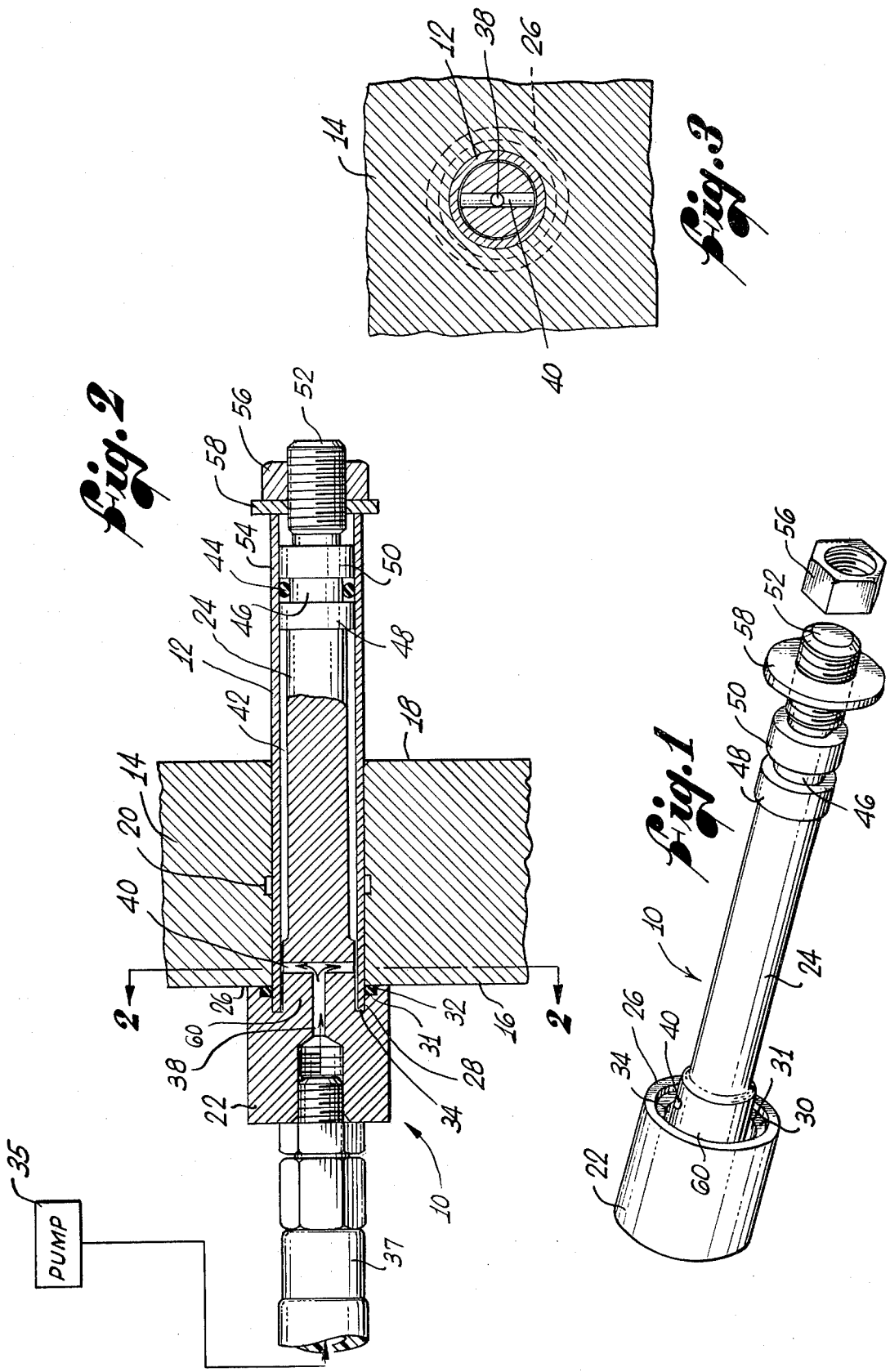

LEAK DETECTION APPARATUS AND METHOD FOR USE WITH TUBE AND TUBE SHEET JOINTS

FIELD OF THE INVENTION

The present invention relates to leak detection apparatus and methods, and, more particularly, to such apparatus and methods for detecting leaks in joints between tubes and tube sheets.

BACKGROUND OF THE INVENTION

The construction of heat exchangers often requires that tubes pass through bores in tube sheets. It is often of critical importance that even small amounts of leakage from the secondary side of a tube sheet to the primary side be avoided. The principal, if not the only substantial source of such leaks is the joints between the tubes and the sheets. The forming of leak proof joints is thus a primary consideration in the construction of such heat exchangers.

In the case of heat exchangers of the type used in nuclear power plants, a steel tube sheet might be two feet thick and have as many as 1000 or more tubes passing through it. Water to be confined to the secondary side of the exchanger may contain levels of contamination that are not acceptable on the primary side. Pretesting of joint forming techniques to assure reliable and repeatable results before construction of the exchanger begins is, therefore, imperative in this context. Moreover, it is also important to be able to demonstrate, in advance, the effectiveness and reliability of the technique to be used.

When the exchanger is to be built, the tubes are positioned in the bores in the tube sheet, and expanded by swagging to form tight joints. In accordance with the present state of the art, swagging is accomplished hydraulically, forcing each tube to expand until it diametrically enlarges the hole in which it has been inserted. When the pressure is removed, the hole diameter is again reduced, due to the elasticity of the tube sheet, and the tube is tightly clamped in place.

Care must be taken to determine the optimum parameters for forming a particular series of joints. It can be difficult to evaluate such factors as the surface finish of the holes and the tubes, the optimum configuration of the holes (which may be entirely cylindrical or many include grooves into which the tubes can expand) and the hydraulic pressure required. Pressures of 30,000 psi and more may be used, but it is desirable to avoid complications associated with unnecessarily high pressures that could result in damage to the tubes or the sheet. For example, if excessive pressure is applied the tube sheet could be deformed in the area of an adjacent joint.

An objective of the present invention is to provide a leak detection apparatus and method for use with tube-and-tube-sheet joints, thereby facilitating testing, experimentation and demonstrations with respect to such joints.

SUMMARY OF THE INVENTION

The present invention resides in a leak detection apparatus that accomplishes the above objective. It includes a head having an end surface that bears against a first face of a tube sheet and a mandrel that extends from the head into a tube that passes through the sheet. An annular fluid-flow space exists between the mandrel and the inside of the tube. Pressurized test fluid is supplied to that space by a conduit that passes through the mandrel, and preferably through the head. The test fluid can flow around one end of the tube and, if the joint between the tube and the tube sheet is not leak proof, the fluid will escape through the joint to be detected at a second face of the tube sheet opposite the first.

In one form of the invention, an inner seal is carried by the head to engage the first face of the tube sheet and to confine the test fluid. An outer seal carried by the mandrel engages the inside of the tube. Both seals may be O-rings.

Another aspect of the invention relates to a securement means for holding the apparatus in place while the test is performed. The securement means, which may be a drawbolt arrangement, engages one end of the tube that extends away from the head and pulls the head toward that end.

In a preferred embodiment, the head defines an annular recess in which the outer seal is confined. The head and mandrel together define a deep groove, communicating with the recess, in which an end of the tube projecting from the tube sheet can be received.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective, partially exploded view of the leak detection apparatus of the present invention (the seals being omitted to show the spaces in which they are received);

FIG. 2 is a partially broken away plan view of the apparatus of FIG. 1 positioned within a tube and tube sheet, the broken away portion of the apparatus being shown substantially in a longitudinal cross-section; and FIG. 3 is a cross-sectional view of the detection apparatus, tube and tube sheet taken along the line 3—3 of FIG. 2.

DESCRIPTION OF THE PREFERRED EMBODIMENT

A leak detection apparatus 10, constructed in accordance with the present invention and shown in FIGS. 1-3 of the accompanying drawings, is used to test an exemplary joint between a tube 12 and a tube sheet 14. The apparatus 10 is particularly well suited for testing joints for a heat exchanger of the type used in nuclear power plants.

The tube 12 of this joint is cylindrical and extends through a bore in the sheet 14, the bore being normal to the primary and secondary sheet faces 16 and 18. The bore includes a single annular groove 20 at its midpoint and the tube 12 has been swagged against the sheet 14 by hydraulic pressure in an effort to form a leak-proof joint. Radially outward deformation of the tube 12 into groove 20 anchors the tube in the tube sheet 14 and provides a leakage barrier at the corners of the groove. Although the tube 12 would ordinarily extend well beyond the secondary face 18, it has been cut off at a short distance from the face for test purposes.

The two principal components of the apparatus 10 (shown separately in FIG. 1) are a head 22 and an elongated mandrel 24 that extends from the head. The head 22, being cylindrical, presents a flat, annular end surface 26 that bears against the primary face 16 of the tube sheet 14 in a region surrounding a first end 28 of the tube 12. An annular recess 30 is formed in the head 22 just inside the end surface 26 to provide a shoulder 31 that positions an outer seal 32 of the O-ring type so that the seal is held against the primary face 16.

The mandrel 24, being elongated and generally cylindrical, projects axially into the tube 12 from the primary side 16. A deep annular groove 34 is defined between the mandrel 24 and the head 22 in which the tube end 28, that projects slightly from the tube sheet 14 in the conventional manner, can be received. This groove 34 is bounded on the outside by the head 22 and on the inside by the mandrel 24. The recess 30 opens into one end of the groove 34 in a radially inward direction.

Test fluid, such as oil or water from a pump 3 of the type used for hydraulic swagging, is supplied to the head 22 through a high pressure line 37. A fluid conduit 38 that extends through the head 22 and then axially along the mandrel 24 communicates with the line 37. At its inner end, the conduit 38 terminates in a cross-bore 40 that passes diametrically through the mandrel 24 and opens into an annular fluid-flow space 42 between the mandrel 24 and the inside of the tube 12. At the end of the mandrel 24 opposite the head 22 is an inner seal 44 of the O-ring type that encircles the mandrel 24, being axially positioned by a mandrel groove 46 between two lands 48 and 50.

The mandrel 24 is held in the tube 12 by a draw bolt arrangement including a bolt-like member 52 that is integrally formed with the mandrel. This member 52 extends axially from the mandrel away from the head 22 to project from the end 54 of the tube 12 on the secondary side of the sheet 14. The bolt 52 is engaged by an internally threaded nut member 56 of larger diameter that presses a thrust washer 58 against the end 54 of the tube 12.

The use of the apparatus 10 will now be described. First, the tube 12 is inserted in a bore of the tube sheet 14 and an exemplary joint to be tested and evaluated is then formed by applying hydraulic pressure to the interior of the tube. The tube 12 ends at a short distance from the secondary side of the tube sheet 14 leaving a length of the tube 14 to be tested in place, as best shown in FIG. 2. Then the mandrel 24 of the apparatus 10 is inserted in the tube 12 from the primary side of the tube sheet 14, the head 22 being positioned so that its end surface 26 is flush with the primary face 16. The washer 58 is placed over the end of the bolt-like extension 52 of the mandrel 24, and the nut 54 is threaded onto the extension until the washer pushes against the end of the tube 12. In this way, the head 22 is pulled tightly against the primary side 16 of the sheet 14.

Pressurized test fluid is then supplied through the conduit 38 into the fluid flow space 42 surrounding the mandrel 24. Under the force of the test fluid, the inner O-ring seal 44 is pressed against the outer end of the groove 46 and expands radially to prevent the escape of fluid at the end 54 of the tube 12 on the secondary side of the sheet 14.

The test fluid flows along the inside of the tube 12 into the groove 34. Although the mandrel 24 has an increased diameter portion 60 near the head 22, there is a clearance between the mandrel and the tube 12 that forms a continuation of the annular flow space 42 (not visible in FIGS. 2 and 3) through which the fluid can pass. The fluid then flows around the end 34 of the tube 12 and back along the outside of the tube toward the primary face 16 of the sheet 14. The outer seal 32 prevents the test fluid from escaping between the end surface 16 of the head 22 and the primary face 16 of the tube sheet 14.

Fluid can escape only by passing through the joint between the tube 12 and the sheet 14. If there is a leak in the joint, the test fluid will, therefore, emerge at the secondary side of the tube sheet 14 where it can be detected visually. The test fluid pressure applied by the pump 35 can be monitored, if desired, to determine the pressure at which any leakage commences.

It will be apparent from the description above that the apparatus and method of the invention provide a highly effective, readily used and convenient technique for testing a tube-and-tube sheet joint. By testing a variety of different by formed joints, it is possible to evaluate the effects of swagging pressure, surface finish, groove configuration and other such parameters.

It will be understood from the following that while particular forms of the invention have been illustrated and described, various modifications can be made without departing from the spirit and scope of the invention. Accordingly, it is not intended that the invention be limited except as by the appended claims.

I claim:

1. An apparatus for pressurized leakage testing of a tube and tube sheet joint comprising:
   a head having an end surface for engaging a first face of said tube sheet in the vicinity of said tube;
   a mandrel extending from said head for insertion in said tube so as to define a generally annular fluid-flow space between said mandrel and said tube;
   a fluid supply conduit extending into said mandrel and opening through said mandrel to communicate with said fluid-flow space;
   outer seal means carried by said head for engaging said first face of said tube sheet to confine a test fluid;
   inner seal means carried by said mandrel for engaging the inner surface of said tube and thereby preventing said test fluid from escaping from a first end of said tube; and
   securement means for engaging said first end of said tube and thereby retaining said mandrel in said tube;
   whereby said test fluid can flow from said fluid-flow space toward said head, around a second end of said tube and, if said joint is not leak-proof, can pass between said tube and said tube sheet to emerge and be detected at a second face of said tube sheet opposite said first face.

2. The apparatus of claim 1 wherein said securement means comprises a first threaded member for projecting from said mandrel through said first end and a second threaded member of larger diameter for engaging said first member.

3. The apparatus of claim 1 wherein said seal means are O-rings.

4. The apparatus of claim 1 wherein said head and said mandrel define a groove between them in which to receive said second end of said tube.

5. An apparatus for pressurized leakage testing of a tube-and-tube sheet joint comprising:
   a head having an end surface for engaging an annular portion of a first face of said tube sheet surrounding said tube;
   an elongated mandrel extending from said head for insertion into said tube so as to leave a generally annular fluid-flow space between said mandrel and said tube;

a fluid supply conduit extending through said head into said mandrel and opening into said fluid-flow space;

outer seal means carried by said head for engaging said annular portion of said first tube sheet face to confine a test fluid;

inner seal means encircling said mandrel for engaging the inner surface of said tube to prevent said fluid from escaping from a first end of said tube; and securement means attached to said mandrel for engaging a second end of said tube and thereby pulling said head against said tube sheet to retain said mandrel in said tube;

whereby said test fluid can flow from said fluid flow space, around said second end of said tube and, if said joint is not leak-proof, can pass between said tube and said tube sheet to emerge and be detected at a second face of said tube sheet opposite said first face.

6. The apparatus of claim 5 wherein said head and said mandrel define a groove between them in which to receive said second end of said tube.

7. The apparatus of claim 5 wherein:
said head and said mandrel define a groove between them in which to receive said second end of said tube; and
said head defines an annular recess opening into said groove in which said first seal means is disposed.

8. The apparatus of claim 7 wherein said seal means are O-rings.

9. The apparatus of claim 5 wherein said securement means comprises an externally threaded member of smaller diameter that projects axially from said mandrel and an internally threaded member of larger diameter that receives said externally threaded member.

10. An apparatus for pressurized leakage testing of a tube-and-tube sheet joint comprising:
a head for engaging an annular portion of a first face of said tube sheet and defining an annular recess adjacent to said annular portion;
outer O-ring seal means disposed within said recess for confining a test fluid and preventing it from flowing between said head and said first face;
an elongated generally cylindrical mandrel extending from said head for axial insertion in said tube to define a annular fluid flow space between said mandrel and said tube, a groove being defined between said mandrel and said head in which a first end of said tube is receivable;

inner O-ring seal means encircling said mandrel for engaging the inner surface of said tube to prevent said test fluid from escaping from said tube;

drawbolt means for pulling said head against said first face of said tube sheet, said drawbolt means comprising an externally threaded bolt member extending from said mandrel away from said head and an internally threaded nut member of larger diameter in which said externally threaded member is received; and a supply conduit for said test fluid extending through said head into said mandrel and opening into said fluid-flow space, whereby said test fluid can flow into said fluid-flow space, around a second end of said tube, and, if said joint is not leak-proof, can pass between said tube and said tube sheet to emerge and be detected at a second face of said tube sheet opposite said first face.

11. An apparatus for pressurized leakage testing of a tube and tube sheet joint comprising:
a head having an end surface for engaging a first face of said tube sheet in the vicinity of said tube;
a mandrel extending from said head for insertion in said tube toward a first end thereof so as to define a generally annular fluid-flow space between said mandrel and said tube, said head and said mandrel defining a groove between them in which to receive a second end of said tube;
a fluid supply conduit extending into said mandrel and opening through said mandrel to communicate with said fluid-flow space;
outer seal means carried by said head for engaging said first face of said tube sheet to confine a test fluid, said outer seal means being disposed within an annular recess opening into said groove; and
inner seal means carried by said mandrel for engaging the inner surface of said tube and thereby preventing said test fluid from escaping from a first end of said tube;
whereby said test fluid can flow from said fluid-flow space toward said head, around said second end of said tube and, if said joint is not leak-proof, can pass between said tube and said tube sheet to emerge and be detected at a second face of said tube sheet opposite said first face.

* * * * *